(12) United States Patent
Pandey

(10) Patent No.: US 11,248,929 B2
(45) Date of Patent: Feb. 15, 2022

(54) METHODS AND SYSTEMS FOR CHRONICLED HISTORY INFORMATION IN A MAP

(71) Applicant: HERE GLOBAL B.V., Eindhoven (NL)

(72) Inventor: Abhay Bipin Pandey, Kalyan-West (IN)

(73) Assignee: HERE Global B.V., Eindhoven (NL)

( * ) Notice: Subject to any disclaimer, the term of this patent is extended or adjusted under 35 U.S.C. 154(b) by 335 days.

(21) Appl. No.: 16/413,230

(22) Filed: May 15, 2019

(65) Prior Publication Data

US 2020/0363231 A1    Nov. 19, 2020

(51) Int. Cl.
*G01C 21/36* (2006.01)
*G06F 16/29* (2019.01)

(52) U.S. Cl.
CPC ..... *G01C 21/3682* (2013.01); *G01C 21/3617* (2013.01); *G06F 16/29* (2019.01)

(58) Field of Classification Search
None
See application file for complete search history.

(56) References Cited

U.S. PATENT DOCUMENTS

| | | | |
|---|---|---|---|
| 8,843,315 B1 * | 9/2014 | Barbeau | G01C 21/30 701/486 |
| 9,243,926 B2 | 1/2016 | Strassenburg-Kleciak | |
| 9,305,021 B2 | 4/2016 | Yang et al. | |
| 9,719,791 B2 | 8/2017 | Hall et al. | |
| 9,886,794 B2 | 2/2018 | Van Os et al. | |
| 2008/0163073 A1 | 7/2008 | Becker et al. | |
| 2010/0198814 A1 * | 8/2010 | Petersen | H04W 4/029 707/722 |
| 2014/0111520 A1 | 4/2014 | Cline et al. | |

OTHER PUBLICATIONS

Wang et al., "Exploring Cell Tower Data Dumps for Supervised Learning-based Point-of-interest Prediction", published in City University of Hong Kong, Hong Kong, retrieved on May 15, 2019 from https://dl.acm.org/citation.cfm?doid=2666310.2666478, 4 pages.

* cited by examiner

*Primary Examiner* — Thomas G Black
*Assistant Examiner* — Ana D Thomas
(74) *Attorney, Agent, or Firm* — Ditthavong, Steiner & Mlotkowski

(57) ABSTRACT

A method, a system, and a non-transitory computer-readable storage medium are provided for generating history information associated with a point of interest (POI). The method includes obtaining POI information associated with the POI, extracting relevant POI information from the obtained POI information based on relevance of the POI information with history of the POI, and generating history information associated with the POI in real-time on a user interface from the extracted relevant POI information. The method further includes generating a comparison view of the obtained POI information associated with the POI and comparing the obtained POI information associated with the POI for extracting relevant POI information. The method further includes indexing the extracted POI information using a unique address identifier and storing the indexed POI information in a map database.

20 Claims, 4 Drawing Sheets

METHODS AND SYSTEMS FOR CHRONICLED HISTORY INFORMATION IN A MAP

TECHNOLOGICAL FIELD

The present disclosure generally relates to generating information associated with a point of interest, and more particularly relates to generating history information associated with the point of interest.

BACKGROUND

There may be instances when a point of interest of a user may not be at a location that the user is aware. The point of interest, may be a store, a retail outlet, an institution, a company, etc., may be displaced to a location nearby temporarily or may be closed permanently. When a user reaches a location of the point of interest and does not find it there, the user may be wary about the source of the address of the POI. The user may even doubt his/her spatial memory and navigation skills. On reaching the previous location of the POI, the user may be clueless about the present location of the POI. The user may enquire locally about the present location of the POI and if he/she gets the correct information about the POI, the user may successfully reach the POI. If the user does not get correct information about the POI, the user may navigate to a wrong location of the POI or another retail outlet or institute. The POI due to the displacement may lose on potential buyers. The user may lose interest in the POI, may be a store.

However, in today's times, users make use of maps to navigate to the POIs. However, if the map database is not updated with the current address of the POI, the user may be led to a wrong address and may be left disappointed. Also, the POI may be closed for renovation or may have seasonal closure. Also, the POI may be rebranded due to change in ownership of may be upgraded that may not be updated in the map database. The map may lead to misdirection and confusion of the user to an incorrect location leading to loss of customer ship and monetary loss and loss in time to the users in navigating to the POI. Accordingly, there is a need for a method and system that may track the history associated with the POI and assist the users in navigating towards a current location of the POI.

BRIEF SUMMARY

Vehicles on a road typically rely on map databases that contain information regarding information regarding different POIs in a geographical region, road geometry, lane geometry, road link connectivity, road type, etc. The information about the POIs, in the map databases, may be enriched with data sources that provide name, location co-ordinates, open and close hours of the POI, reviews about the POIs, etc. The data sources may typically crowd source the information about the POIs. The crowd sourced information about the POIs is a large set of data that has to be efficiently filtered for relevance to generate information about history of the POIs in a chronological order. However, manually filtering the relevant history information of the POIs is a laborious task. It would be advantageous for a system to provide history of the POIs on current addresses along with the history of a POI at different addresses from the crowd sourced information about the POIs.

A method, a system, and a computer program product are provided in accordance with an example embodiment described herein for generating history information associated with a point of interest (POI).

Embodiments disclosed herein may provide a method for generating history information associated with a point of interest (POI). The method includes: obtaining POI information associated with the POI, extracting relevant POI information from the obtained POI information based on relevance of the POI information with history of the POI, and generating history information associated with the POI in real-time on a user interface from the extracted relevant POI information. The POI information comprises at least one of a name, a location, hours of operation, descriptive information, contact information, reviews of POI, articles, navigation directions, distances, and travel times to the POI. The POI information is obtained from at least one of mapping and geographic information systems, a local lister database, third party websites, external imageries, and map data layers of the POI. The history information comprises information indicating change in the POI information over duration of time.

The method further includes: generating a comparison view of the obtained POI information associated with the POI and comparing the obtained POI information associated with the POI for extracting the relevant POI information. The method further includes indexing the extracted relevant POI information using a unique address identifier and storing the indexed POI information in a map database. The method further includes receiving on the user interface, an input from a user, wherein the input corresponds to selection of the POI information and generating a navigation route from a start location of a user to the POI based on the history information associated with the POI.

In an example embodiment, a system for generating history information associated with a point of interest (POI) is provided. The system may include at least one non-transitory memory configured to store computer program code instructions, and at least one processor configured to execute the computer program code instructions to at least: obtain POI information associated with the POI, extract relevant POI information from the obtained POI information based on relevance of the POI information with history of the POI, and generate history information associated with the POI in real-time on a user interface from the extracted relevant POI information, The processor is further configured to generate a comparison view of the obtained POI information associated with the POI; and compare the obtained POI information associated with the POI for extracting relevant POI information. The processor is further configured to index the extracted POI information using a unique address identifier; and store the indexed POI information in a map database. The processor is optionally configured to receive via the user interface, an input from a user, wherein the input corresponds to selection of the POI information and generate a navigation route from a start location of a user to the POI based on the history information associated with the POI.

Embodiments of the present invention may provide a non-transitory computer-readable storage medium having computer-executable program code instructions stored therein. The computer-executable program code instructions when executed by a computer, cause the computer to carry out operations including: obtaining POI information associated with the POI, extracting relevant POI information from the obtained POI information based on relevance of the POI information with history of the POI, and generating history information associated with the POI in real-time on a user interface from the extracted relevant POI information, The operations further include generating a comparison view of the obtained POI information associated with the POI and comparing the obtained POI information associated with the POI for extracting relevant POI information. The operations further include indexing the extracted POI information using a unique address identifier and storing the indexed POI information in a map database. The operations further include receiving on the user interface, an input from a user, wherein the input corresponds to selection of the POI information and generating a navigation route from a start location of a user to the POI based on the history information associated with the POI.

BRIEF DESCRIPTION OF THE DRAWINGS

Figure 1:
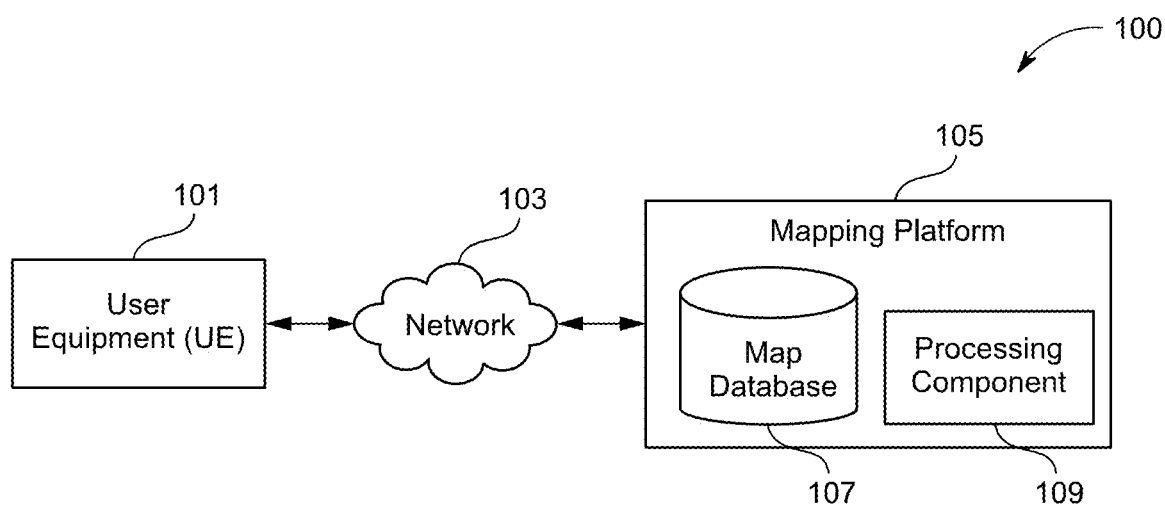
Figure 2:
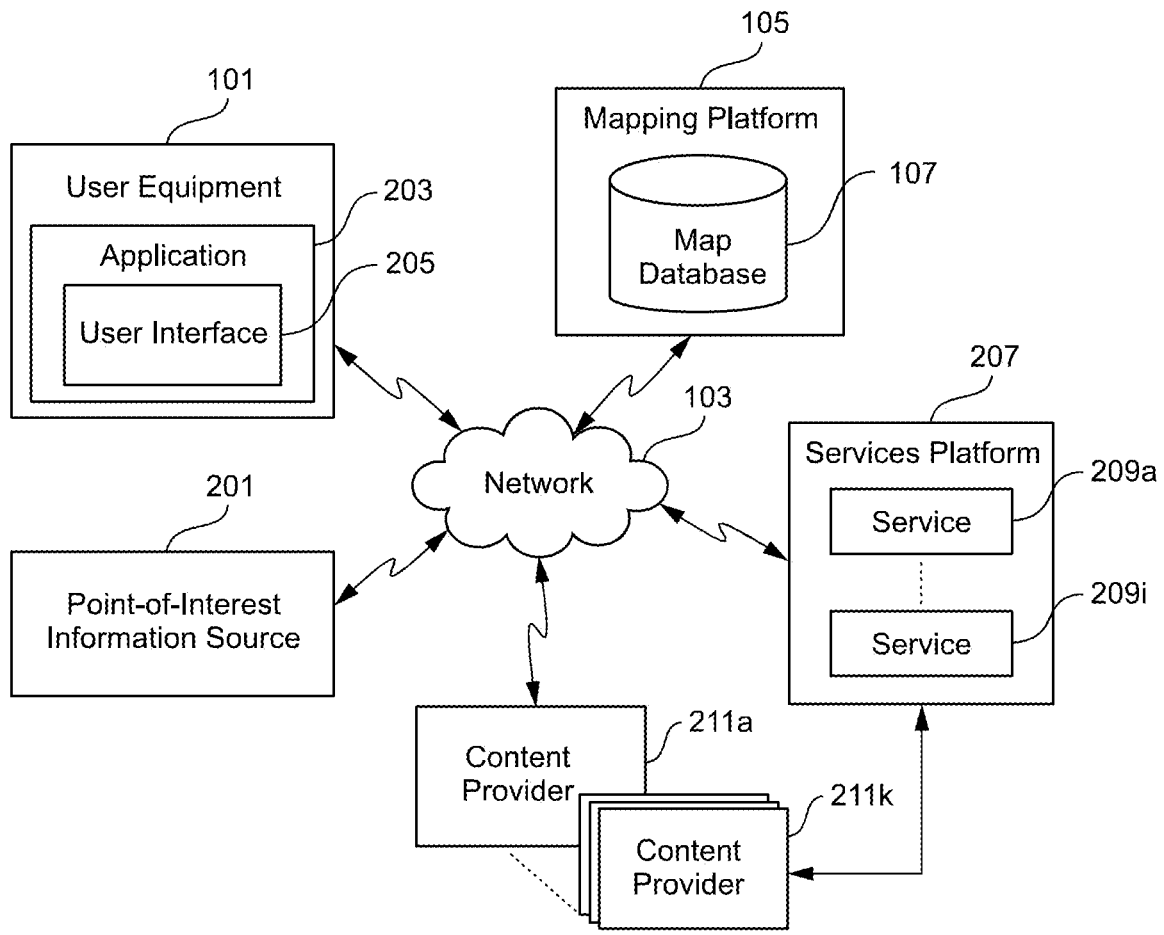
Figure 3:
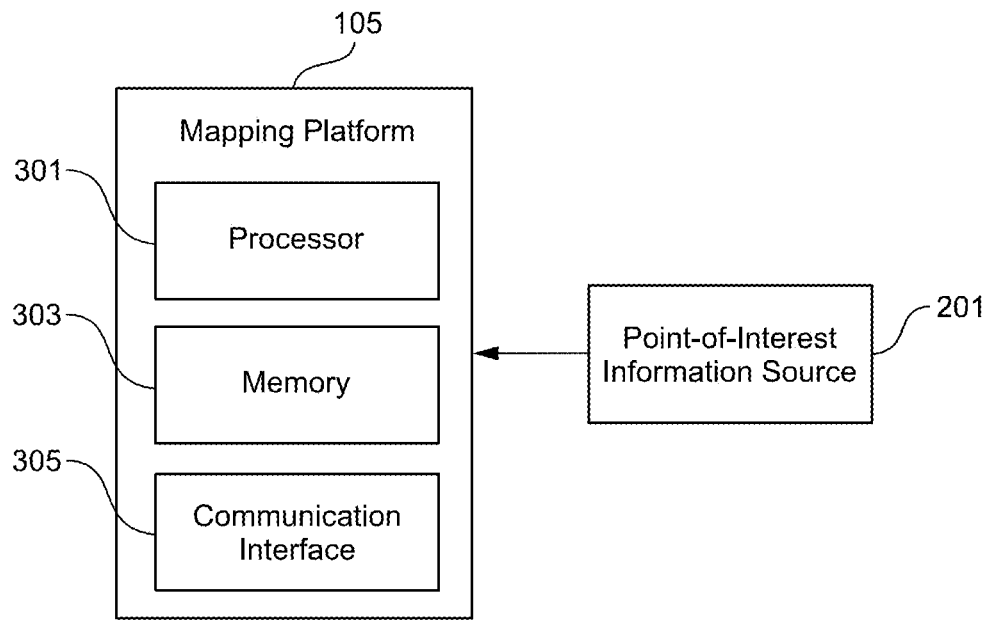
Figure 4:
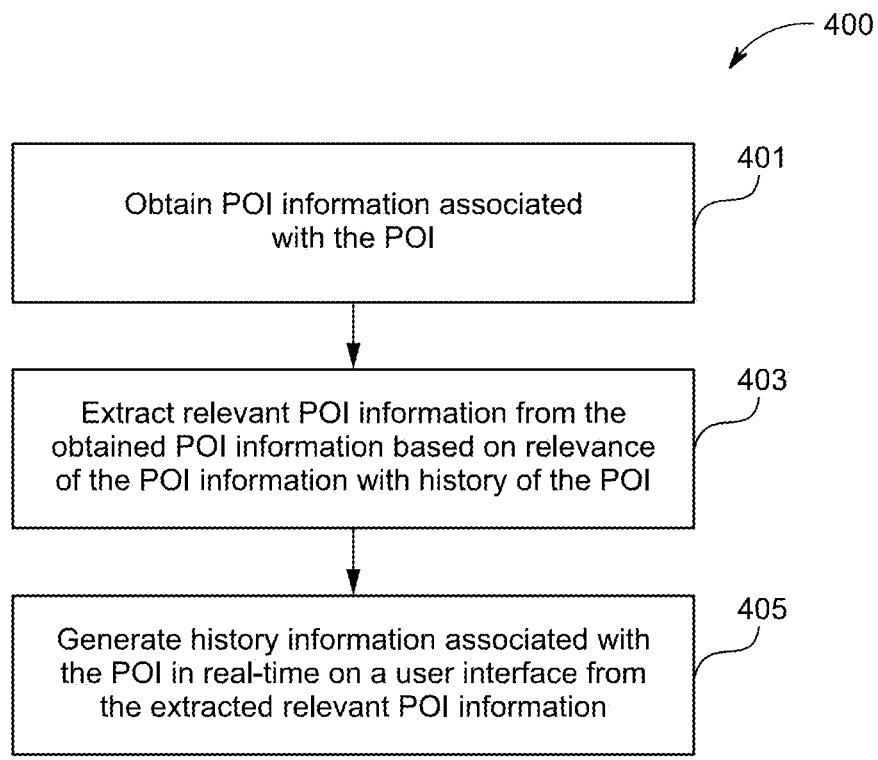
Figure 5A:
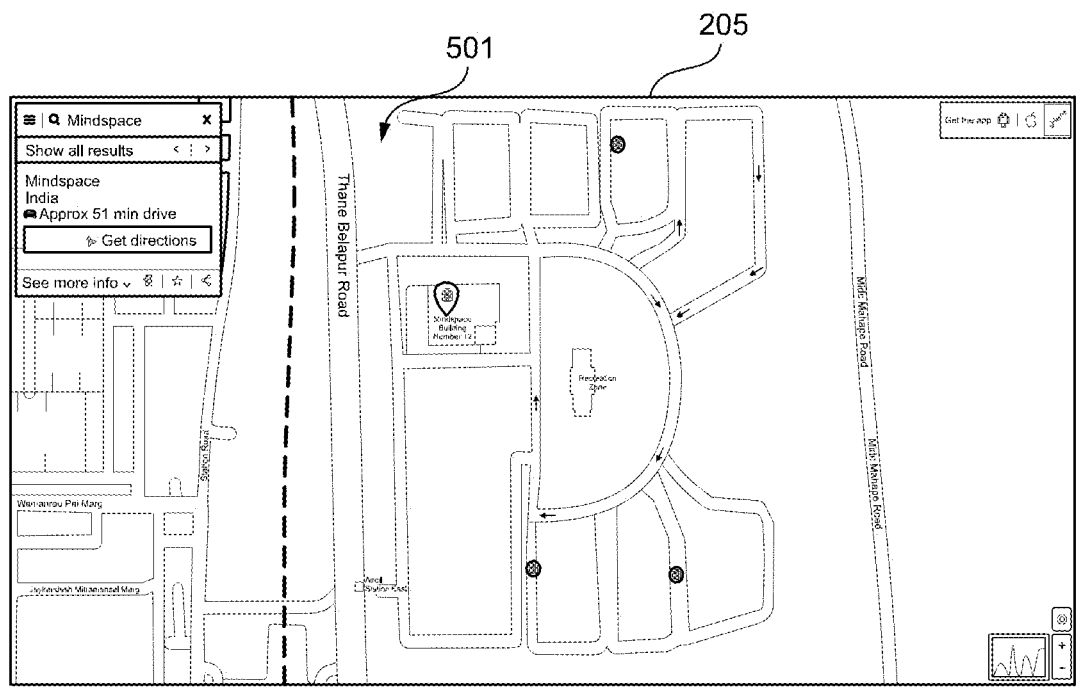
Figure 5B:
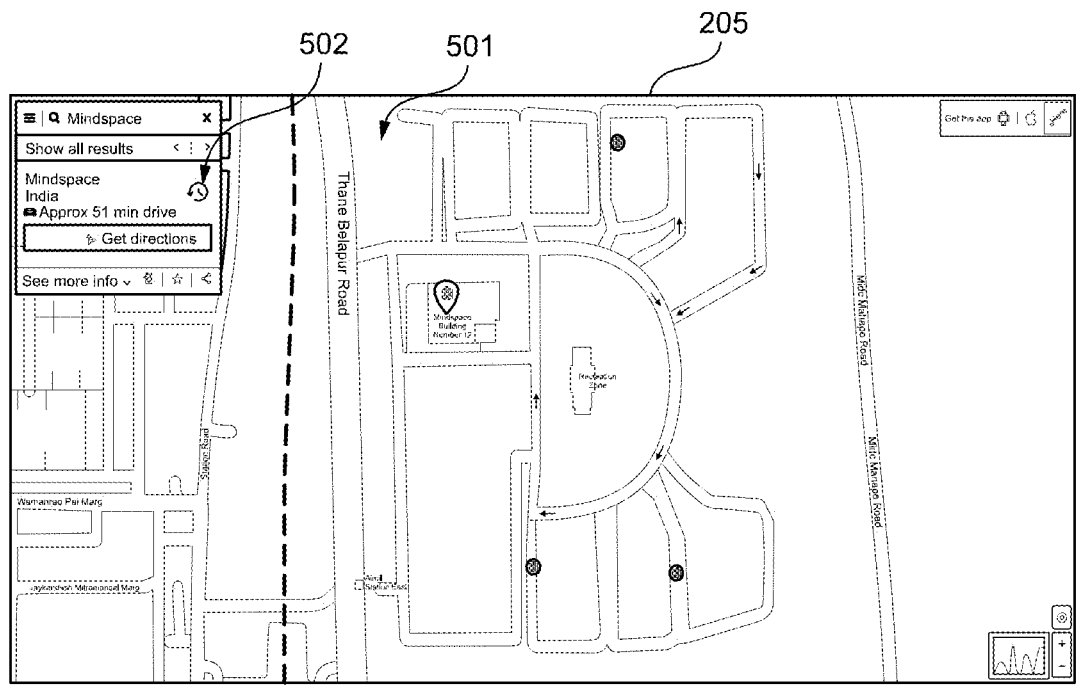
Figure 5C:
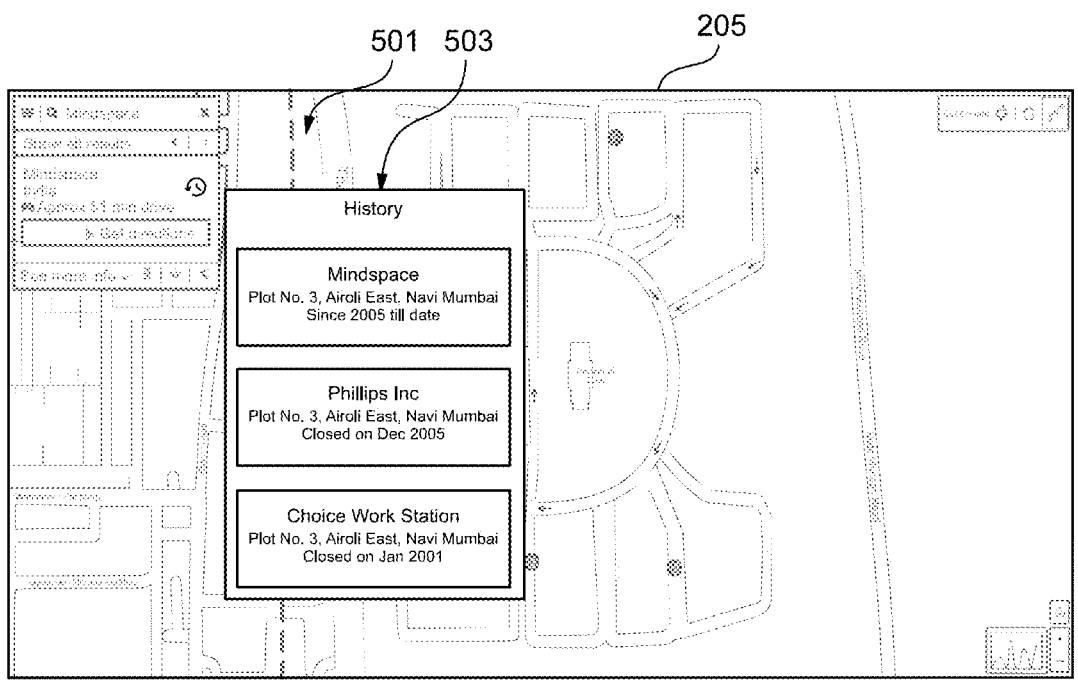

Having thus described example embodiments of the invention in general terms, reference will now be made to the accompanying drawings, which are not necessarily drawn to scale, and wherein:

FIG. 1 illustrates a schematic diagram of a system for generating history information associated with a point of interest (POI), in accordance with an example embodiment;

FIG. 2 exemplarily illustrates a block diagram of one embodiment of a system for generating history information associated with a POI using a mapping platform, in accordance with an example embodiment;

FIG. 3 illustrates a block diagram of a mapping platform exemplarily illustrated in FIG. 2 that may be used to generate history information associated with a POI, in accordance with an example embodiment;

FIG. 4 exemplarily illustrates a method 400 for history information associated with a POI, in accordance with an example embodiment; and FIGS. 5A-5C illustrate screenshots of a user interface displaying a map of a geographical region showing history information associated with a POI, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "route" may be used to refer to a path from a source location to a destination location on any link.

End of Definitions

A method, a system, and a non-transitory computer-readable storage medium are provided herein in accordance with an example embodiment for generating history information associated with a point of interest (POI). FIG. 1 illustrates a schematic diagram of a system 100 for generating history information associated with a point of interest (POI), in accordance with an example embodiment. The POI may be a store, an institution, a retail outlet, a commercial establishment, etc. The system 100 includes a user equipment (UE) or a user device 101, which may be in communication with a mapping platform 105, over a network 103. The network 103 may be wired, wireless, or any combination of wired and wireless communication networks, such as cellular, Wi-Fi, internet, local area networks, or the like. The user equipment 101 may be a navigation system, that may be configured to provide route guidance and navigation related functions to a user of the mapping platform 105. The user equipment 101 may be installed in a vehicle used by a user for navigating to a POI. The user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 105 via a processing component 109 through, for example, a user interface of a mapping application, such that the user equipment 101 may provide navigational assistance to the user among other services provided through access to the mapping platform 105.

As exemplarily illustrated, the mapping platform 105 may also include a map database 107, which may store node data, road segment data or link data, relevant point of interest (POI) information, posted signs related data or the like. In an embodiment, the map database 107 may hold a local replica or a cached version of POI information available in a plurality of external databases of various search service providers, such as Yelp Inc., TripAdvisor, Inc., local listers, etc. In some embodiments, the map database 107 may be a cached version of a map database hosted in a cloud. The map database 107 may also include cartographic data, routing data, and/or maneuvering data. According to some example embodiments, the map database 107 may store history information about POIs in a geographical region, derived by the mapping platform 105 from the POI information obtained from the external databases. Also, according to some embodiments, road segment data records in the map database 107 may be links or segments representing roads, lanes on roads, streets, or paths, as may be used in calculating a route or recorded route information for determination of one or more personalized routes.

The node data may be end points corresponding to the respective links or segments of road segment data. The road link data and the node data may represent a road network, such as used by vehicles, for example, cars, trucks, buses, motorcycles, and/or other entities. Optionally, the map database 107 may contain path segment and node data records or other data that may represent pedestrian paths or areas in addition to or instead of the vehicle road record data, for example. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 may include respective positions of the POI records identified using unique address identifiers.

The map database 107 may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 107 may include event data (e.g., traffic incidents, construction activities, scheduled events, unscheduled events, etc.) associated with the POI data records or other records of the map database 107 associated with the mapping platform 105. The data related to roads may be fetched by the mapping platform 105 from external systems, such as, the municipalities. The POI information may also be obtained from imageries, such as, Google imageries, third party websites, mapping and geographic information systems, etc. The map database 107 further comprises all the links in the geographical area.

A content provider such as a map developer may maintain the mapping platform 105. By way of example, the map developer may collect geographic data to generate and enhance the mapping platform 105. There may be different ways used by the map developer to collect data. These ways may include obtaining data from other sources, such as municipalities or respective geographic authorities. In addition, the map developer may employ field personnel to travel by vehicle employing the user equipment 101 along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, may be used to generate map geometries directly or through machine learning as described herein.

The map database 107 of the mapping platform 105 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing determination of history of POIs, one or more routes through an area and navigation-related functions and/or services through the area, such as, route calculation, route guidance, map display, speed calculation, distance and travel time functions, and other functions, by a navigation device, such as by the user equipment 101, for example. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some embodiments, the mapping platform 105 may be a master geographic database configured at a server side, but in alternate embodiments, a client side mapping platform may represent a compiled navigation database that may be used in or with end user devices (e.g., user equipment 101) to render history information about POIs and also, provide navigation, speed adjustment and/or map-related functions to navigate to and from the POIs. The mapping platform 105 may obtain POI information associated with a POI from a plurality of sources. The POI information may include a name, a location, hours of operation, descriptive information, contact information, reviews of the POI, articles, navigation directions, distances, and travel times to the POI. The mapping platform 105 may further extract relevant POI information from the obtained POI information based on the relevance of the POI information with history of the POI as disclosed in the detailed description of FIG. 3. The mapping platform 105 may further generate history information associated with the POI on the user equipment 101 from the extracted relevant POI information. The history information may include information indicating change in the POI information over a duration of time. The mapping platform 105 may generate a navigation route from a start location to the POI on the user equipment 101. The mapping platform 105 may generate the navigation route from the start location to the POI on the user equipment 101, based on a selection of the POI by the user from the history information rendered on the user equipment 101. In an embodiment, the mapping platform 105 may generate a navigation route from the POI to another destination location on the user equipment 101. The mapping platform 105 may be used with the end user device, that is, the user equipment 101 to provide the user with navigation features. In such a case, the mapping platform 105 may be downloaded or stored on the user equipment 101 which may access the mapping platform 105 through a wireless or wired connection, over the network 103.

In one embodiment, the user device or the user equipment 101 may be an in-vehicle navigation system, such as, an infotainment system, a personal navigation device (PND), a portable navigation device, a cellular telephone, a smart phone, a personal digital assistant (PDA), a watch, a camera, a computer, a workstation, and/or other device that may perform navigation-related functions, such as digital routing and map display. An end user may use the user equipment 101 for navigation and map functions such as guidance and map display, according to some example embodiments.

FIG. 2 exemplarily illustrates a block diagram of one embodiment of a system 200 for generating history information associated with a point of interest (POI) using a mapping platform 105, in accordance with an example embodiment. The system 200 includes a user equipment 101, including an application 203 with a user interface 205 for accessing one or more map and navigation related functions. The user equipment 101 may be a hand held device in possession of a user accessing a POI. In an embodiment, the user equipment 101 may be installed in a vehicle used by the user to navigate towards or away from the POI. The user equipment 101 may also include one or more sensors, such as a camera, a camera array, an acceleration sensor, a gyroscopic sensor, a LIDAR sensor, a proximity sensor, a motion sensor and the like. The sensors 207 may primarily be used for detecting road signs and determining positioning of the vehicle 201 and the sensors 207 may be built-in or embedded into or within interior of the user equipment 101. In some embodiments, the user equipment 101 uses communication signals for position determination.

The sensors 207 such as the accelerometer, the gyroscope, and the like can be used to detect the location and heading of the vehicle, The user equipment 101 may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. The data collected by the sensors 207 may be used to gather information related to an environment of the vehicle 201, such as, the area, the current location of a POI, surroundings of the POI, operation hours of a POI, distance of the POI from certain landmarks in the geographical region. In some embodiments, one or more sensors may be positioned on or within and the sensors may provide data indicating a location of the vehicle 201, heading of the vehicle, speed of the vehicle, etc. The data collected by the sensors may be transmitted to the OEM cloud. Vehicle data, also referred to herein as "probe data", may be collected by any device capable of determining the necessary information, and providing the necessary information to a remote entity. The user equipment 101 is one example of a device that may function as a probe to collect probe data of a vehicle 201.

More specifically, probe data collected by the user equipment 101 may be representative of the location of a vehicle 201 at a respective point in time and may be collected while a vehicle 201 is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The user equipment 101, may be any device capable of collecting the aforementioned probe data.

The data collected by the sensor or the probe data may constitute the POI information used by the mapping platform to generate history information associated with POIs in a geographical region. In one example, the mapping platform similar to the mapping platform 105 exemplarily illustrated in FIG. 1, may obtain POI information, constituting the sensor data from the user equipment 101, to generate history information associated with a POI. The sensors and/or the vehicle may constitute the different POI information sources 201. The POI information sources 201 may be mapping and geographic information systems, a local lister database, third party websites, external imageries, and map data layers of the POI. The mapping and geographic information system may be a system designed to capture, store, manipulate, analyze, manage, and present all types of geographical data of the POI. The map data layers may be containers for geospatial data. The map data layers may represent a particular theme of geospatial data. The map data layers may include streams, lakes, terrain, roads, boundaries, utility lines, etc. The map data layers may be generated from the data records in the map database 107 by the mapping platform 105. The map data layers may hold information about the POI, such as, the environment of the POI, connectivity to the POI, etc. The map data layers may be updated year by year based on changes in the topography of the geographical region. The local lister database may be an external database maintained by local search service providers, such as, Yelp Inc., Trip Advisor Inc., etc. The local lister database may include POI information, such as, location of the POI, operation hours of the POI, reviews about the POI, contact information of the POI, etc. The local lister database is updated regularly since the local lister database is maintained based on crowdsourcing. The processing of the obtained POI information associated with the POI to generate history information associated with the POI is performed by the processor 303, exemplarily illustrated in FIG. 3, same as a processing component 109 exemplarily illustrated in FIG. 1, in the mapping platform 105 exemplarily illustrated in FIG. 3.

The system 200 may further include a services platform 207, which may be used to provide navigation related functions and services 209a-209i to the application 203 running on the user equipment 101. The services 209a-209i may include such as navigation functions, speed adjustment functions, traffic related updates, weather related updates, warnings and alerts, parking related services, indoor mapping services and the like. The services 209a-209i may be provided by a plurality of content providers 211a-211k. In some examples, the content providers 211a-211k may access various SDKs from the services platform 207 for implementing one or more services. In an example, the services platform 207 and the mapping platform 105 may be integrated into a single platform to provide a suite of mapping and navigation related applications for OEM devices, such as the user equipment 101. The user equipment 101 may be configured to interface with the services platform 207, the content provider's services 211a-211k, and the mapping platform 105 over a network 103. Thus, the mapping platform 105 and the services platform 207 may enable provision of cloud-based services for the user equipment 101, such as, storing the POI information in a OEM cloud in batches or in real-time and retrieving the stored POI information for generating history information associated with the POI, as disclosed in the detailed description of FIG. 3, by vehicles carrying the user equipment 101.

FIG. 3 illustrates a block diagram of a mapping platform 105 exemplarily illustrated in FIG. 2 that may be used to generate history information associated with a POI, in accordance with an example embodiment of the present invention. In the embodiments described herein, the mapping platform 105 may include a processing means such as at least one processor 301, a storage means such as at least one memory 303, and a communication means such as at least one communication interface 305. The processor 301 may retrieve computer program code instructions that may be stored in the memory 303 for execution of the computer program code instructions. The mapping platform 105 may be in communication with the plurality of POI information sources 201. As disclosed in the detailed description of FIG. 2, the processor 301 obtains the POI information from the plurality of the POI information sources 201 via the communication interface 305. The processor 301 may obtain a POI from a user from the user equipment 101 via the communication interface 305.

Based on the POI received from the user, the processor 301 fetches the POI information associated with the POI from the plurality of POI information sources 201. The POI information such as, the name, location, hours of operation, descriptive information, contact information, reviews of the POI, articles, navigation directions, distances, and travel times to the POI may constitute the mapping and geospatial data, the local listers data, data from third party websites, mapping and geospatial data from Google imageries, and map data layers, etc. In an embodiment, the processor 301 creates a database for storing and analysis of the obtained POI information. In an embodiment, the processor 301 may store the obtained POI information in the map database 107. In an embodiment, the map database 107 may be one of the plurality of POI information sources 201 as the map database 107 may include the map data layers that accumulate data about layers in a geographical region.

In an embodiment, the processor 301 may generate a unified comparison view of the stored POI information that allows for easy comparison of the POI information from different POI information sources. The processor 301 may query the huge dataset of POI information in the map database 107 to generate the comparison view. In an embodiment, the processor 301 may query the POI information based on the timestamp associated with POI information, based on the category of the POI information, based on the source of the POI information, based on the trustworthiness of the source of the POI information, etc., and generate a comparison view. The timestamp associated with the POI information may indicate when the POI information was recorded by one of the POI information sources 201. The category of the POI information may be operation hours, reviews, location, travel time, etc. The trustworthiness of the source of the POI information may be ratings awarded to the POI information source 201 by one or more rating service providers since most of the POI information is crowd sourced. In an embodiment, if the POI information is obtained from a combination of POI information sources, the processor 301 may compute a ratio of match between the POI information from the POI information sources with respect to credibility of the POI information sources. If the ascertained ratio of match is fulfilled with the combinations of the POI information sources, then the processor 301 may utilize the POI information from the combination of the above mentioned sources. In an embodiment, the processor 301 may utilize the POI information from the combination of the POI information sources, in case all the POI information sources provide correct POI information.

Using the comparison view, the processor 301 compares the obtained POI information based on the timestamp associated with POI information, based on the category of the POI information, based on the source of the POI information 201, based on the trustworthiness of the source of the POI information 201, etc., to extract relevant POI information. The processor 301 may extract the relevant POI information from the stored POI information based on relevance of the POI information with history of the POI. That is, based on relevance of the category of the POI information to the history of the POI, the processor 301 extracts relevant POI information associated with the POI. Based on the timestamp associated with the POI information, the processor 301 may determine if a change in the POI information over a duration of time has occurred. The relevant POI information may include the name, the location, the descriptive information, and the contact information associated with POI. In an embodiment, the processor 301 may index the extracted relevant POI information using an unique address identifier, that is, the Address_ID associated with the POI and stores the indexed POI information in the map database. The Address_ID may allow the map database 107 to be updated with the changes in the POI information associated with the POI.

The processor 301 may receive a request from the user on the user interface 205 of the user equipment 101 for the history associated with the POI. The processor 301 may generate the history information in real time on the user interface 205 from the relevant POI information. The history information may include the relevant POI information presented in a chronological order along with the time stamp associated with the relevant POI information as exemplarily illustrated in FIGS. 5A-5C. The processor 301 may query the relevant POI information as per the year and render as history information on a map. Using the Address_ID, the new or current POI information and the history information associated with the POI are indexed in the map database 107.

In an embodiment, the processor 301 may generate a navigation route from a location of a user to the current location of the POI based on the current POI information on the user interface 205 of the user equipment 101. The processor 301 may, in some embodiments, output notifications regarding alternative navigation routes from a location of the user to the current location of the POI on the user interface 205. In an embodiment, the processor 301 may render indications of traffic at the current location of the POI on the user interface 205. In an embodiment, the processor 301 may provide navigation suggestions to the user of the vehicle to avoid the traffic at the current location of the POI. The different representations of the navigation suggestions may be in the form of a map with color coded or patterned road links indicating traffic conditions on the route, etc.

The processor 301 may be embodied in a number of different ways. For example, the processor 301 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 301 may include one or more processing cores configured to perform independently. A multi-core processor may enable multiprocessing within a single physical package. Additionally or alternatively, the processor 301 may include one or more processors configured in tandem via the bus to enable independent execution of instructions, pipelining and/or multithreading.

Additionally or alternatively, the processor 301 may include one or more processors capable of processing large volumes of workloads and operations to provide support for big data analysis. In an example embodiment, the processor 301 may be in communication with a memory 303 via a bus for passing information among components of the mapping platform 105. The memory 303 may be non-transitory and may include, for example, one or more volatile and/or non-volatile memories. In other words, for example, the memory 303 may be an electronic storage device (for example, a computer readable storage medium) comprising gates configured to store data (for example, bits) that may be retrievable by a machine (for example, a computing device like the processor 301). The memory 303 may be configured to store information, data, content, applications, instructions, or the like, for enabling the apparatus to carry out various functions in accordance with an example embodiment of the present invention. For example, the memory 303 could be configured to buffer input data for processing by the processor 201. As exemplarily illustrated in FIG. 3, the memory 303 may be configured to store instructions for execution by the processor 201. As such, whether configured by hardware or software methods, or by a combination thereof, the processor 301 may represent an entity (for example, physically embodied in circuitry) capable of performing operations according to an embodiment of the present invention while configured accordingly. Thus, for example, when the processor 301 is embodied as an ASIC, FPGA or the like, the processor 301 may be specifically configured hardware for conducting the operations described herein. Alternatively, as another example, when the processor 301 is embodied as an executor of software instructions, the instructions may specifically configure the processor 301 to perform the algorithms and/or operations described herein when the instructions are executed. However, in some cases, the processor 301 may be a processor specific device (for example, a mobile terminal or a fixed computing device) configured to employ an embodiment of the present invention by further configuration of the processor 301 by instructions for performing the algorithms and/or operations described herein. The processor 301 may include, among other things, a clock, an arithmetic logic unit (ALU) and logic gates configured to support operation of the processor 301.

In some embodiments, the processor 301 may be configured to provide Internet-of-Things (IoT) related capabilities to users of the system 101 disclosed herein, such as, the delivery person and the delivery service provider companies. The IoT related capabilities may in turn be used to provide smart city solutions by providing real time parking updates, big data analysis, and sensor-based data collection by using the cloud based mapping system for providing navigation and parking recommendation services to the autonomous delivery vehicle. In some embodiments, the mapping platform 105 may be configured to provide an environment for development of parking strategy recommendation solutions for navigation systems in accordance with the embodiments disclosed herein. The environment may be accessed using the communication interface 305. The communication interface 305 may provide an interface for accessing various features and data stored in the mapping platform 105.

In some embodiments, the mapping platform 105 may be configured to provide a repository of algorithms for implementing a plurality of location based services for navigation systems. For example, the mapping platform 105 may include algorithms related to geocoding, routing (multimodal, intermodal, and unimodal), clustering algorithms, machine learning in location based solutions, natural language processing algorithms, artificial intelligence algorithms, and the like. The data for the mapping platform 105 may be collected using a plurality of technologies including but not limited to drones, sensors, connected cars, cameras, probes, chipsets, from plurality of POI information sources, and the like. The collected data may be processed by the processor 301 to generate history information associated with a point of interest (POI), according to the embodiments disclosed herein. As noted above, the mapping platform 105 may be embodied by the processing component. However, in some embodiments, the mapping platform 105 may be embodied as a chip or chip set. In other words, the mapping platform 105 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The mapping platform 105 may therefore, in some cases, be configured to implement an example embodiment of the present invention on a single "system on a chip." As such, in some cases, a chip or chipset may constitute a means for performing one or more operations for providing the functionalities described herein.

The user interface 205 of the user equipment 101 may in turn be in communication with the processor 301 to provide output to the user and, in some embodiments, to receive an indication of a user input. In some example embodiments, the system 200 may include a user interface 205 that communicates with the processor 301 and displays input and/or output of the mapping platform 105. As such, the user interface 205 may include a display and, in some embodiments, may also include a keyboard, a mouse, a joystick, a touch screen, touch areas, soft keys, one or more microphones, a plurality of speakers, or other input/output mechanisms. In one embodiment, the processor 301 may comprise user interface circuitry configured to control at least some functions of one or more user interface elements such as a display and, in some embodiments, a plurality of speakers, a ringer, one or more microphones and/or the like. The processor 301 and/or user interface circuitry comprising the processor 301 may be configured to control one or more functions of one or more user interface elements through computer program instructions (for example, software and/or firmware) stored on a memory accessible to the processor 301 (for example, memory device 303, and/or the like). In some example embodiments, the processor 301 may be configured to provide a method for history information associated with a point of interest (POI) as will be discussed in conjunction with FIG. 4 as below.

FIG. 4 exemplarily illustrates a method 400 for history information associated with a point of interest (POI), in accordance with an example embodiment. It will be understood that each block of the flow diagram of the method 400 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 303 of the mapping platform 105, employing an embodiment of the present invention and executed by a processor 301 of the apparatus. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory 303 that may direct a computer or other programmable apparatus to function in a particular manner, such that the instructions stored in the computer-readable memory 303 produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 400 illustrated by the flow diagram of FIG. 4 for generating history information associated with a POI includes, at 401, obtaining POI information associated with the POI from a plurality of POI information sources. The POI information may include a name, a location, hours of operation, descriptive information, contact information, reviews of a POI, articles, navigation directions, distances, and travel times to the POI. The POI information may be obtained from mapping and geographic information systems, a local lister database, third party websites, external imageries, and/or map data layers of the POI.

At 403, the method 400 may include extracting relevant POI information from the obtained POI information based on relevance of the POI information with history of the POI. At 405, the method 400 may include generating history information associated with the POI in real-time on the user interface 205 from the extracted relevant POI information. The history information may include information indicating change in the POI information over a duration of time. In an example embodiment, a system for performing the method of FIG. 4 above may comprise a processor (e.g. the processor 301) configured to perform some or each of the operations (401-405) described above. The processor may, for example, be configured to perform the operations (401-405) by performing hardware implemented logical functions, executing stored instructions, or executing algorithms for performing each of the operations. Alternatively, the system may comprise means for performing each of the operations described above. In this regard, according to an example embodiment, examples of means for performing operations 401-405 may comprise, for example, the processor 301 and/or a device or circuit for executing instructions or executing an algorithm for processing information as described above. The processor may iterate the steps 401-405 at fixed intervals of time in order to update the POI information in the map database 107.

On implementing the method 400 disclosed herein, the end result generated by the mapping platform 105 is a tangible determination of history information associated with a point of interest (POI). The history information comprises the previous POI information and the current POI information in a chronological order. The history information may help the user to reach and locate a specific POI. The user may locate the POI with additional information about the POI, such as, the current POI information, previous POI information, closure of the POI, or any movement, existence of the POI in years and months, details of the owner of the POI, review of the POI, as well as the new address location of the POI. In case of rebranding of the POI, the user may identify the POI based on the history information of the POI. The history information associated with a POI generated by the mapping platform may be used by N number of clients and businesses like Ola Cabs of ANT Technologies Pvt. Ltd., Uber of Uber Technologies Inc., Zomato, etc., and other emerging businesses that require data about the POI for running their businesses.

The history information associated with numerous POIs may also be used for researching and analyzing the market strategies aiding in progress of businesses in a geographical region. In an embodiment, the history information may be monetized by Government Organizations. The mapping platform 105 provides current status, that is, address of the POI and shows evolution of the current address of the POI from past in a chronological order. The mapping platform 105, in addition to descriptive information about the evolution of the current address of the POI, may also provide a sequence of images of evolution of the POI from the past. The mapping platform 105 derives the history information from the relevant POI information. The relevant POI information may be verified to eliminate erroneous data. The relevant POI information and the derived history information associated with POIs may be provided to users using the mapping application associated with the mapping platform 105 for smooth navigation. The mapping platform 105 receives a huge data set of POI information from verified and unverified sources of the POI information. The mapping platform 105 efficiently extracts relevant POI information and verifies the POI information, thus automating a laborious task and increasing reliability on the extracted relevant POI information. Since the extracting of the relevant POI information from the POI information filters out irrelevant POI information, the generation of the history information associated with the POI from the relevant POI information is less resource intensive.

FIGS. 5A-5C illustrate screenshots of a user interface 205 displaying a map 501 of a geographical region showing history information associated with a POI, in accordance with an example embodiment. As exemplarily illustrated in FIG. 5A, a user of the user equipment 101 plans to navigate to a POI in the geographical region. The mapping platform 105 may provide the navigation route from the current location of the user to the current location of the POI. As exemplarily illustrated in FIG. 5B, the user may request for history information associated to a current location of the POI using a history button/icon 502. The history button/icon 502 may be a user selectable option and when a user provides the selection through the history button/icon 502, the map 501 may show history information 503 about the current address as exemplarily illustrated in FIG. 5C. The history information 503 may include previous some years information about the current address. In an embodiment, the history information 503 may include the history of the POI over last few years in a chronological order. As seen, the mapping platform shows the history information 503 including names of companies that were located a current address of "Mindspace" over last 5 years.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. A method for generating history information associated with a point of interest (POI), the method comprising:
   obtaining POI information associated with the POI;
   extracting relevant POI information from the obtained POI information based on relevance of the POI information with history of the POI; and
   generating chronological history information associated with the POI in real-time on a user interface from the extracted relevant POI information.

2. The method of claim 1, further comprising:
   generating a comparison view of the obtained POI information associated with the POI from different POI information sources; and
   comparing the obtained POI information associated with the POI from the different POI information sources, using the comparison view, for extracting the relevant POI information.

3. The method of claim 1, further comprising:
   indexing the extracted relevant POI information using a unique address identifier; and
   storing the indexed POI information in a map database.

4. The method of claim 1, wherein the POI information comprises at least one of a name, a location, hours of operation, descriptive information, contact information, reviews of a POI, articles, navigation directions, distances, and travel times to the POI.

5. The method of claim 1, wherein the POI information is obtained from at least one of mapping and geographic information systems, a local lister database, third party websites, external imageries, and map data layers of the POI.

6. The method of claim 1, wherein the history information comprises information indicating change in the POI information over a duration of time.

7. The method of claim 1, further comprising:
   receiving on the user interface, an input from a user, wherein the input corresponds to selection of the POI information; and
   generating a navigation route from a start location of the user to the POI based on the history information associated with the POI.

8. A system for generating history information associated with a point of interest (POI), the system comprising:
   at least one memory configured to store computer program code instructions; and
   at least one processor configured to execute the computer program code instructions to:
      obtain POI information associated with the POI;
      extract relevant POI information from the obtained POI information based on relevance of the POI information with history of the POI; and
      generate chronological history information associated with the POI in real-time on a user interface from the extracted relevant POI information.

9. The system of claim 8, wherein the at least one processor is further configured to:
   generate a comparison view of the obtained POI information associated with the POI from different POI information sources; and
   compare the obtained POI information associated with the POI from the different POI information sources, using the comparison view, for extracting relevant POI information.

10. The system of claim 8, wherein the at least one processor is further configured to:
    index the extracted POI information using a unique address identifier; and
    store the indexed POI information in a map database.

11. The system of claim 8, wherein the POI information comprises at least one of a name, a location, hours of operation, descriptive information, contact information, reviews of POI, articles, navigation directions, distances, and travel times to the POI.

12. The system of claim 8, wherein the POI information is obtained from at least one of mapping and geographic information systems, a local lister database, third party websites, external imageries, or map data layers of the POI.

13. The system of claim 8, wherein the history information comprises information indicating change in the POI information over a duration of time.

14. The system of claim 8, wherein the at least one processor is further configured to:
    receive via the user interface, an input from a user, wherein the input corresponds to selection of the POI information; and generate a navigation route from a start location of the user to the POI based on the history information associated with the POI.

15. A non-transitory computer-readable storage medium having stored thereon, computer-executable program code instructions, which when executed by a computer, cause the computer to perform operations for generating history information associated with a point of interest (POI), the operations comprising:
 obtaining POI information associated with the POI;
 extracting relevant POI information from the obtained POI information based on relevance of the POI information with history of the POI; and
 generating chronological history information associated with the POI in real-time on a user interface from the extracted relevant POI information.

16. The non-transitory computer-readable storage medium of claim 15, wherein the operations further comprise:
 generating a comparison view of the obtained POI information associated with the POI from different POI information sources; and
 comparing the obtained POI information associated with the POI from the different POI information sources, using the comparison view, for extracting relevant POI information.

17. The non-transitory computer-readable storage medium of claim 15, wherein the operations further comprise:
 indexing the extracted POI information using a unique address identifier; and
 storing the indexed POI information in a map database.

18. The non-transitory computer-readable storage medium of claim 15, wherein the operations further comprise generating a navigation route from a start location of a user to the POI based on the history information associated with the POI.

19. The non-transitory computer-readable storage medium of claim 15, wherein the POI information comprises at least one of a name, a location, hours of operation, descriptive information, contact information, reviews of POI, articles, navigation directions, distances, and travel times to the POI.

20. The non-transitory computer-readable storage medium of claim 15, wherein the history information comprises information indicating change in the POI information over a duration of time.

* * * * *